Dec. 8, 1970 G. J. DUNNIGAN ET AL 3,546,480
MONITOR CIRCUIT FOR ASYNCHRONOUS DIGITAL SIGNALS FOR MAINTAINING OUTPUT SIGNAL LEVEL FOR DURATION OF APPLIED HOLD SIGNAL
Filed July 29, 1968
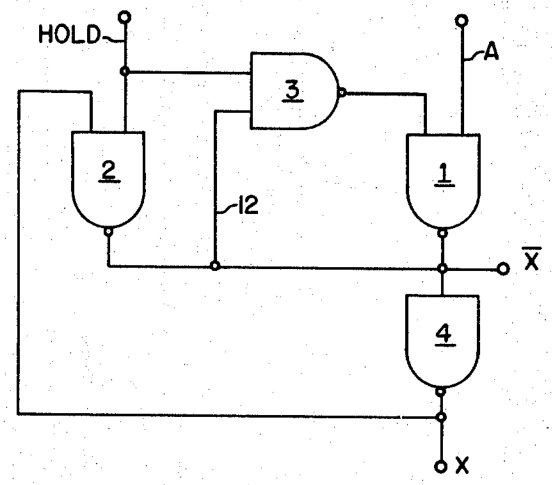
FIG. 1.
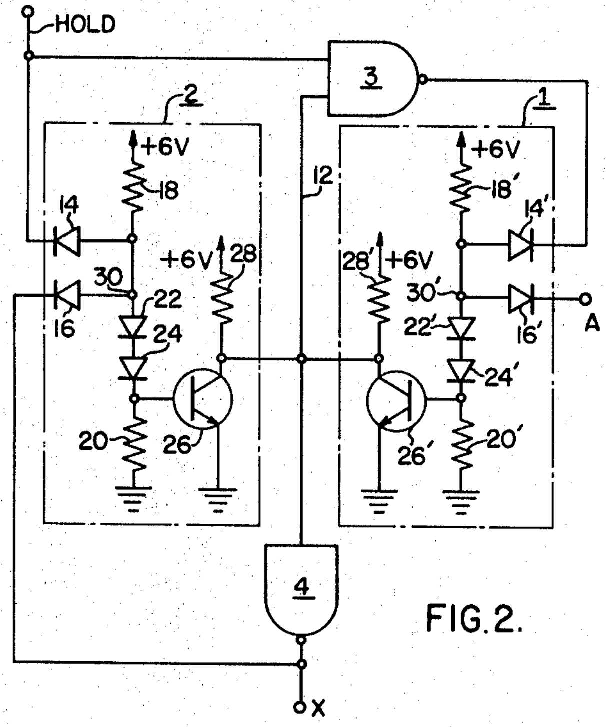
FIG. 2.
FIG. 3.
| t | HOLD | A | X |
|---|---|---|---|
| $t_0$ | 0 | 1 | 1 |
| $t_1$ | 1 | 1 | 1 |
| $t_2$ | 1 | 0 | 1 |
| $t_3$ | 1 | 0 | 1 |
| $t_4$ | 1 | 1 | 1 |
| $t_5$ | 0 | 1 | 1 |
| $t_6$ | 0 | 0 | 0 |
| $t_7$ | 0 | 0 | 0 |
| $t_8$ | 0 | 1 | 1 |
| $t_9$ | 0 | 1 | 1 |
| $t_{10}$ | 0 | 0 | 0 |
| $t_{11}$ | 1 | 0 | 0 |
| $t_{12}$ | 1 | 1 | 0 |
| $t_{13}$ | 0 | 1 | 1 |
| $t_{14}$ | 0 | 0 | 0 |
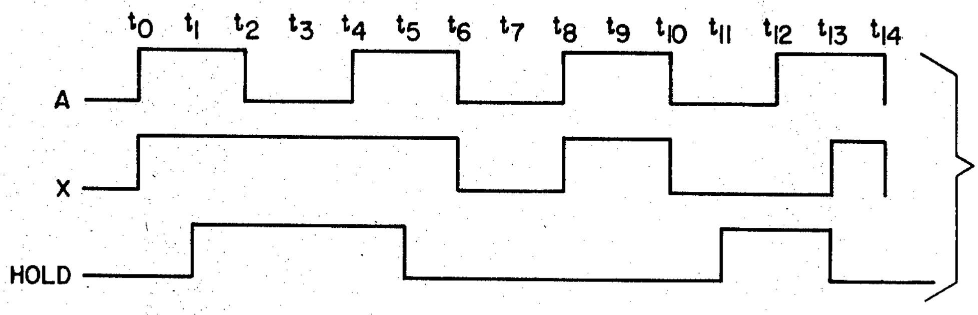
FIG. 4.
WITNESSES
Theodore F. Wrobel
James H. Young
INVENTORS
Gerard J. Dunnigan
and Marvin E. French
BY Dean Schron
ATTORNEY United States Patent Office 3,546,480

Patented Dec. 8, 1970

3,546,480

MONITOR CIRCUIT FOR ASYNCHRONOUS DIGITAL SIGNALS FOR MAINTAINING OUTPUT SIGNAL LEVEL FOR DURATION OF APPLIED HOLD SIGNAL

Gerard J. Dunnigan, Baltimore, and Marvin E. French, Glen Burnie, Md., assignors to Westinghouse Electric Corporation, Pittsburgh, Pa., a corporation of Pennsylvania Filed July 29, 1968, Ser. No. 748,461

Int. Cl. H03k 19/36

U.S. Cl. 307—215 6 Claims

ABSTRACT OF THE DISCLOSURE

Described is circuitry for permitting an asynchronous input digital signal to appear at the output of the circuitry at random until, at a predetermined time and in response to a HOLD signal, the output of the circuit will remain at its last ON or OFF condition regardless of changes in the input signal. This condition persists until the HOLD signal is removed, whereupon the output from the circuit continues to follow the asynchronous input signal. The foregoing is accomplished by NAND circuit components which can be combined into a single microelectronic device.

BACKGROUND OF THE INVENTION

In many digital circuit applications, it is necessary to provide means for following an incoming asynchronous digital signal until the circuit is instructed to hold whatever logic level is present. For example, if an "$n$" bit binary number consisting of ON and OFF signals is to be monitored until a certain number is reached, or a certain time is reached, and thereafter the binary number is to be stored, some means must be provided for following the ON and OFF signals until the proper time or number is reached, whereupon the binary number last applied to the input is stored regardless of further changes in the input.

Devices for monitoring and storing digital signals have been provided in the past; however such devices are not altogether reliable and require a relatively large number of circuit components. For example, one typical prior art device requires two flip-flop circuits and four NAND gates packaged in three separate microelectronic circuit boards.

SUMMARY OF THE INVENTION

As an overall object, the present invention provides new and improved circuit apparatus for monitoring or storing digital signals with the use of NAND circuit elements only.

More specifically, an object of the invention is to provide a digital monitor and storage device of the type described which can be incorporated into a single microelectronic device.

In accordance with the invention, ON and OFF digital input signal are applied to one input of a first NAND circuit element; while a HOLD or STORE signal is applied to one input of a second NAND circuit element, the outputs of the first and second NAND elements being connected in parallel. The HOLD signal and the parallel-connected outputs of the first and second NAND elements are applied to a third NAND element; while the output of this third NAND element is applied as a second input to the first NAND element. The circuit is completed by an inverting NAND element whose input is connected to the parallel-connected outputs of the first and second NAND elements and has its output connected to a second input of the second NAND element.

With this arrangement, and since the outputs from the first and second NAND elements are in parallel such that actuation of one NAND element will effectively disable the other, and asynchronous digital signal applied to the input of the first NAND element will appear at the output of the inverter with the output of the inverter following the input. However, when a HOLD signal is applied to the second and third NAND elements, and because of the parallel output connection of the first and second NAND elements, the level of the output signal will remain at its value which it had just prior to application of the HOLD signal. The inverse of the output signal is also available as an output.

The above and other objects and features of the invention will become apparent from the following detailed description taken in connection with the accompanying drawings which form a part of this specification and in which:

FIG. 1 is a schematic circuit diagram of the digital monitor and storage device of the invention;

FIG. 2 is a circuit diagram similar to that of FIG. 1, but showing the details of two of the NAND circuits of the device of the invention;

FIG. 3 is a logic truth table illustrating the operation of the circuits of FIGS. 1 and 2; and FIG. 4 comprises waveforms illustrating the operation of the invention.

With reference now to the drawings, and particularly to FIG. 1, the circuit shown includes four NAND circuit elements numbered 1, 2, 3 and 4, these circuits corresponding to the first, second, third and fourth NAND elements defined in the appended claims. As is known, digital signals are usually referred to as ON or OFF, "1" or "0," or possibly positive or negative. In the logic notation used herein, a "1" or "ON" signal will be assumed to be positive; whereas a "0" or "OFF" signal will be assumed to be negative. Furthermore, as is well known to those skilled in the art, a NAND circuit is one in which the output will be "0" or negative only when all of its inputs have "1" or positive signals applied thereto. At all other times, the output of the NAND circuit will be "1" or positive.

Applied to terminal A of the circuit of FIG. 1 is the asynchronous digital signal which is to be monitored and/or stored. The signal is applied to one input of NAND element 1 along with the output of NAND element 3. Applied to one input of each of the NAND elements 2 and 3 is a HOLD signal which, when it is positive or "1" instructs the circuit to maintain or store the level of the last-to-be-received digital signal or pulse. The outputs of NAND elements 1 and 2 are applied in parallel to an inverter comprising NAND element 4 and the output of the NAND element 4 is applied to the other input terminal of the NAND element 2. The circuit is completed by means of lead 12 which connects the parallel outputs of NAND elements 1 and 2 to one input of the NAND element 3. Output signals from the circuit appear at terminal X and $\overline{X}$, the one being the inverse of the other.

With reference now to FIG. 2, the details of NAND elements 1 and 2 are shown. NAND element 2, for example, includes a diode 14 to which HOLD signals are applied and a second diode 16 to which the output of the circuit on terminal X is applied. The anodes of the diodes 14 and 16 are connected to a voltage divider comprising resistors 18 and 20 connected in series with diodes 22 and 24 between ground potential and a source of +6 volts potential. The junction of resistor 20 and the cathode of diode 24, in turn, is connected to the base of an NPN transistor 26 having its emitter connected directly to ground and its collector connected through resistor 28 to a source of +6 volts potential. Output signals from the circuit are taken from the collector of NPN transistor 26 as shown.

When "0" or negative signals are applied to the cathodes of both of the diodes 14 and 16, both diodes will conduct and the voltage at point 30 will fall, thereby blocking the diodes 22 and 24 and maintaining the voltage on the base of the NPN transistor 26 sufficiently negative to cut it off. When a "0" or negative signal is applied to the cathode of one diode 14 or 16 while a "1" or positive signal is applied to the cathode of the other, only one diode will conduct. Nevertheless, the voltage at point 30 will still block current flow through diodes 22 and 24.

Now, let us assume that "1" or positive signals are applied to the cathodes of both of the diodes 14 and 16, thereby causing these diodes to block. The voltage at point 30 now rises in the positive direction as does the voltage at the upper terminal of resistor 20 and the base of transistor 26, thereby causing the transistor 26 to conduct and the voltage on its collector to fall. This produces a "0" or negative signal at the output of the NAND circuit. In this manner, it can be seen that the only way in which a "0" or negative signal can be produced at the output of the NAND circuit is when two "1" or positive signals are applied to its inputs.

The elements of NAND circuit 1 are the same as those for NAND circuit 2 and are identified by like, primed reference numerals. It will be noted that since the collectors of the transistors 26 and 26' are connected to a common output terminal or lead 12, once one of the transistors 26 or 26' conducts, it shorts out the other transistor. For example, if transistor 26 conducts, thereby producing a "0" or negative signal at its collector, transistor 26 is shorted; and even though a "0" or negative signal is applied to the cathode of diode 14' or 16', the output of the circuit must nevertheless be a "0" rather than a "1." Similarly, when transistor 26' is in the conductive state, thereby producing a "0" output, signals applied to the cathodes of diodes 14 and 16 can have no effect on the output of the NAND element 2.

Let us assume that the HOLD signal applied to the circuit must be in the "1" logic state before the circuit will store the last-to-be-received digital signal, and that when the HOLD signal is "0" or negative, the output of the circuit should follow the asynchronous input digital signal. Under these circumstances (i.e., a "0" signal applied to the HOLD terminal) the output of the NAND element 3 must always be "1" or positive remembering that in order to produce a "0" output from a NAND element, both of the inputs to that element must be "1."

Now that it has been established that a "1" output will be derived from NAND element 3 with a "0" HOLD signal, let us assume that a "1" digital signal is applied to input terminal A. Under these circumstances, and with two "1" signals applied to the input of NAND element 1, its output will be "0." When this is inverted in NAND element 4, the output from this circuit appearing at terminal A will be "1," the same as the input. Now, if the input digital signal applied to terminal A switches to logic level "0," the inputs to NAND element 1 are "0" and "1," thereby producing a "1" output which, when inverted in NAND element 4, produces a "0" output on terminal X, corresponding to the input. In this manner, it can be seen that when the HOLD signal is "0," the output on terminal X must follow the input on terminal A.

Assume that it is desired to hold or store the last digital signal level to be received. Under these circumstances, a "1" signal will be applied to the HOLD terminal; while the output of NAND element 3 may be "0" or "1." If a "1" input digital signal is on terminal A at this time, a "1" signal will appear on terminal X. When this is applied to NAND element 2 along with the "1" HOLD signal, the output of NAND element 2 will be "0." This "0" signal is applied to the inverting NAND element 4 and, in accordance with the explanation given in connection with FIG. 2, will persist regardless of changes in the output of NAND element 1.

Let us assume, now, that the input on terminal A changes to "0." Under ordinary circumstances, and assuming that the HOLD signal was not "1," this would cause a "1" output at NAND element 1 and a "0" output from NAND element 4. Since HOLD is a "1" and because of the parallel connection of the outputs of NAND elements 1 and 2 as explained above, the "0" output signal from NAND element 2 will override what would otherwise be a "1" output from NAND element 1, thereby maintaining the "1" output at terminal X.

On the other hand, let us assume that the signal applied to input terminal A when a "1" HOLD signal appears is a "0." Under these circumstances, the output of NAND element 4 would be a "0" signal when the HOLD signal was applied. This means that a "1" and a "0" input are applied to the NAND element 2, thereby producing a "1" output. The output of the NAND element 3 under these circumstances is a "0" since it has "1" signals applied to both of its inputs, and it will maintain a constant "0" output which, of course, insures that the output from NAND element 1 will be "1" and that from NAND element 4 "0" as long as the HOLD signal persists.

The operation of the circuit can be further understood by reference to FIGS. 3 and 4. In FIG. 4, it can be seen that input applied to terminal A is a pulsed or digital signal wherein the pulses persist for two time periods. That is, pulses persist from time $t_0$ to time $t_2$, from time $t_4$ to time $t_6$, from time $t_8$ to time $t_{10}$, and so on. The output, appearing as waveform X in FIG. 4, will depend upon the existence or absence of a HOLD signal. Let us assume that at time $t_1$ a HOLD signal is applied and that the input A is a "1." Under these circumstances, the "1" or positive output will persist until the HOLD signal is removed at time $t_5$. However, at time $t_5$, the input at A is still "1," meaning that the output persists at "1" until time $t_6$ as shown in FIG. 3 where the input becomes "0." At time $t_6$, the HOLD signal is "0," meaning that the output X follows the input until time $t_{11}$ is reached; whereupon the HOLD signal again becomes "1." At this point, the input A is "0," meaning that the output at X remains at "0" until time $t_{13}$ is reached, whereupon the HOLD signal becomes "0" and the output at X again follows the input at A.

It can be seen, therefore, that the present invention provides a circuit comprised solely of NAND circuit elements which can monitor a digital signal or store that signal at will. Furthermore, since the circuitry employs only four NAND circuit elements, it can be packaged into a single microelectronic device comprising four interconnected NAND gates in a quad gate package.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. Apparatus for monitoring digital signals and for maintaining the last-to-be-received digital signal at its logic level in response to a HOLD signal, comprising first, second and third logic circuit elements each having a pair of inputs, means for applying a digital signal to be monitored to one input of said first logic circuit element, means for applying said HOLD signal to one input of each of said second and third logic circuit elements, an inverter, means connecting the outputs of both of said first and second logic circuit elements to the input of said inverter and the other input of said third logic circuit element, means connecting the output of said third logic circuit element to the other input of said first logic circuit element, and means connecting the output of said inverter to the other input of said second logic circuit element.

2. The combination of claim 1 wherein said first, second and third logic elements comprise NAND circuit elements.

3. The combination of claim 2 wherein each of said NAND circuit elements is provided with an inverting output stage comprising a transistor, the output from the NAND circuit element being taken between the emitter and collector of said transistor whereby conduction through the transistor inverter stage of one of said first and second NAND circuit elements will short out the transistor inverter stage of the other of said first and comprises a fourth NAND circuit element.

4. The combination of claim 2 wherein said inverter comprises a fourth NAND circuit element.

5. The combination of claim 2 wherein output signals from said apparatus are derived from the output of said inverter.

6. The combination of claim 2 wherein output signals from said apparatus are derived at the input to said inverter.

References Cited

UNITED STATES PATENTS 3,075,091 1/1963 Homan ------------ 328—92X

OTHER REFERENCES

Pub. I: "Latching Circuitry" by Homan in IMB Tech. Disclosure Bulletin, vol. 4, No. 8, January 1962, pp. 66 to 69.

STANLEY D. MILLER, Primary Examiner

U.S. Cl. X.R.

307—203, 214; 328—92